(12) United States Patent
Chansarkar

(10) Patent No.: US 6,539,304 B1
(45) Date of Patent: *Mar. 25, 2003

(54) GPS NAVIGATION SYSTEM USING NEURAL NETWORKS

(75) Inventor: Mangesh M. Chansarkar, Sunnyvale, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/008,867

(22) Filed: Nov. 2, 2001

Related U.S. Application Data

(63) Continuation of application No. 09/662,412, filed on Sep. 14, 2000.

(51) Int. Cl.[7] ............................................. G06F 165/00

(52) U.S. Cl. ................. 701/213; 701/200; 73/178 R; 342/457

(58) Field of Search .................... 701/213, 214, 701/200, 209; 73/178 R; 342/457, 463

(56) References Cited

U.S. PATENT DOCUMENTS

| | | | | |
|---|---|---|---|---|
| 5,548,512 A | * | 8/1996 | Quraishi | 180/167 |
| 5,717,406 A | * | 2/1998 | Sanderford et al. | 342/363 |
| 5,774,831 A | * | 6/1998 | Gupta | 342/357.02 |
| 5,917,449 A | * | 6/1999 | Sanderford et al. | 342/457 |
| 5,983,161 A | * | 11/1999 | Lemelson et al. | 340/436 |
| 6,084,547 A | * | 7/2000 | Sanderford et al. | 342/457 |
| 6,212,473 B1 | * | 4/2001 | Stefan et al. | 340/990 |
| 6,216,086 B1 | * | 4/2001 | Seymour et al. | 701/202 |
| 6,252,544 B1 | * | 6/2001 | Hoffberg | 342/357.06 |
| 6,351,711 B1 | * | 2/2002 | Chansarkar | 701/200 |

* cited by examiner

Primary Examiner—William A. Cuchlinski, Jr.
Assistant Examiner—Olga Hernandez
(74) Attorney, Agent, or Firm—Fulwider Patton Lee & Utecht, LLP

(57) ABSTRACT

A GPS receiver includes a satellite receiver/processor having an input that receives input signals from at least one GPS satellite. The output of the receiver/processor provides satellite-related navigation information. A neural network receives the satellite-related information to obtain an output signal representative of receiver-related navigation information. The neural network includes a first node layer connected to a second node layer through a first connection layer and a third node layer connected to the second node layer through a second connection layer. Each of the node layers comprises a plurality of neurons.

9 Claims, 4 Drawing Sheets

GPS NAVIGATION SYSTEM USING NEURAL NETWORKS

RELATED APPLICATIONS

This is a continuation of co-pending application Ser. No. 09/662,412 filed Sep. 14, 2000.

BACKGROUND OF THE INVENTION

1. Field of the Invention

The invention relates generally to GPS navigation systems and more particularly, to a GPS navigation system utilizing neural network technology as an alternative to traditional methods of solving GPS navigation equations.

2. Description of Related Art

Traditional GPS receivers solve GPS navigation equations utilizing recursive least squares and extended Kalman filter techniques. Each of these well known techniques, however, tend to exhibit a high sensitivity to measurement errors. Accordingly, alternative solution techniques are desirable.

Neural networks are information processing systems composed of a large number of simple processing elements called neurons. Many kinds of neural network models have been proposed and extensively used in various signal processing applications. The key features of neural networks are asynchronous parallel and distributed processing, nonlinear dynamics, global interconnection of network elements, self-organization, and high-speed computational capability.

Neural networks have been designed to mimic the human brain as much as possible in the realm of mathematics and to try and duplicate the intelligence of the human brain. The design of a neural network follows the model of the human brain in terms of a large collection of individual nodes (neurons in biological terminology) interconnected to one another in a fashion similar to the neuron connections in a human brain. Neural network systems are capable of solving virtually any problem that involves mapping input data to output data. Generally, a neural network can be classified into various categories varying from supervised learning to unsupervised self learning networks.

It has been shown that a neural network can approximate any continuous and differentiable function to any degree of accuracy. This property leads to many potential applications of neural networks in signal processing such as blind signal separation, image registration, blind deconvolution and many others.

Generally, and in the simplest case, the topology of a neural network consists of a single layer of fully interconnected processors or neurons. More often, the network is divided into multiple layers with full interconnection between layers but not necessarily with every neuron. One layer of neurons may be used to input values into the network, while another layer may output the final results. In between the input and output layer, there may be intermediate or hidden layers. The hidden layers are necessary to allow solutions of nonlinear problems. When the weighting matrices and various parameters associated with the activation functions have been set to correct levels, a complex stimulus pattern at the input layer successively propagates between hidden layers, to result in an often simpler output pattern.

Typically, a neural network is "taught" by feeding a succession of input patterns and corresponding expected output patterns. The network "learns" by measuring, directly or indirectly, the difference or error, at each output unit, between the desired output pattern and the pattern that it just produced. Having done this, the internal weights and activation parameters of the hidden layer(s) are modified by a learning algorithm to provide an output pattern which more closely approximates the desired output pattern, while minimizing the error over the spectrum of input patterns. Neural network learning is an iterative process, involving multiple "lessons". Neural networks have the ability to process information in the presence of noisy or incomplete data and yet still generalize to the correct solution.

Hence, those skilled in the art have recognized a need for alternative methods of solving GPS navigation equations having less sensitivity to measurement errors. The invention fulfills these needs and others.

SUMMARY OF THE INVENTION

Briefly, and in general terms, the present invention is directed to a method of and a device for solving GPS navigation equations. The invention is further directed to systems incorporating such devices.

In a first aspect, the invention relates to a method of determining navigation data for a GPS receiver. The method includes receiving input signals via the GPS receiver from at least one GPS satellite. The input signals include satellite-related navigation information. The method further includes applying the input signals to a neural network to obtain an output signal representative of receiver-related navigation information.

In a detailed facet of the invention, the input signals include at least one of a position vector of the GPS satellite and a pseudorange measurement of the GPS satellite. In another detailed aspect, the neural network comprises one of either a discrete-time Hopfield neural network, a continuous-time Hopfield neural network, a cellular neural network, a multilayer perception networks, a self-organizing system, a radial basis function network or a high-order neural network. In yet another detailed aspect, the neural network comprises an first node layer connected to a second node layer through a first connection layer and a third node layer connected to the second node layer through a second connection layer. In this aspect, applying the input signals to a neural network to obtain an output signal includes connecting the input signals to the second node layer through the first node layer and the first connection layer; connecting the outputs of the second node layer to the third node layer through the second connection layer; and combining the outputs of the second node layer to provide receiver position data.

In a second aspect, the invention relates to a GPS receiver comprising a satellite receiver/processor having an input receiving input signals from at least one GPS satellite and an output providing satellite-related navigation information. The receiver further includes a neural network having an input receiving the satellite-related information to obtain an output signal representative of receiver-related navigation information.

In a detailed aspect of the invention, the neural network includes a first node layer connected to a second node layer through a first connection layer and a third node layer connected to the second node layer through a second connection layer. In another detailed aspect, the first node layer comprises a plurality of input neurons receiving the input signals, the second node layer comprises a plurality of hidden neurons connected to the plurality of input neurons through the first connection layer and the third node layer comprises a plurality of output neurons connected to the hidden neurons through the second connection layer. In still another facet of the invention, the second connection layer is weighted.

In a third aspect, the invention relates to a navigation system for tracking the position of an object within a geographic area. The system includes a satellite receiver/processor having an input receiving input signals from at least one GPS satellite and an output providing satellite-related navigation information. The system also includes a neural network having an input receiving the satellite-related information to obtain an output signal representative of receiver-related navigation information. Also included in the system are complimentary devices such as a presentation device for presenting the receiver-related navigation information to a system user, processing devices such as a computer system, or a transmission/communication device such as a cellular telephone for transmitting the receiver-related navigation information across a communication link.

In a detailed aspect of the invention, the presentation device includes a map data base that stores information related to the geographic area. The device also includes a map matching processor that receives as input the receiver-related navigation information and combines the geographic-area information with the navigation information to provide display information. The device also includes a display responsive to the display information for providing an indication of the position of the object. In another detailed aspect of the invention, the transmission/communication device includes, but is not limited to, a cellular phone which transmits the receiver-related navigation information to a base station where it is used as an input to a presentation device as described previously.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
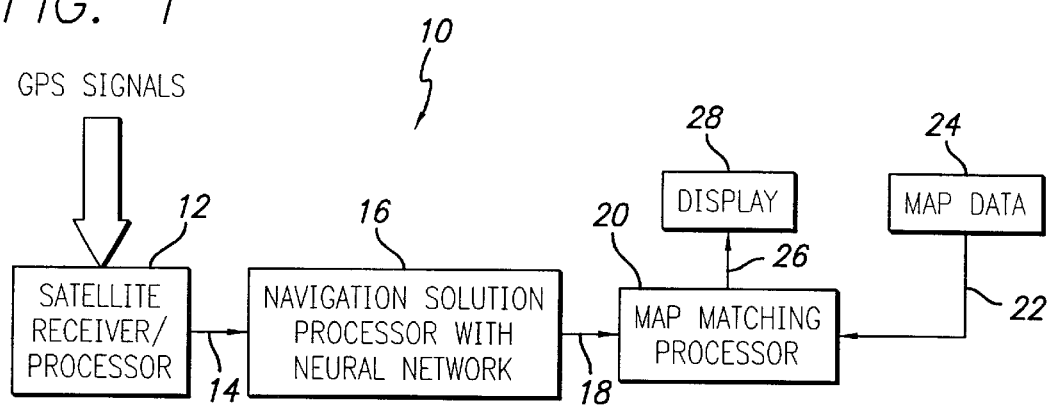
FIG. 1 is a block diagram of a GPS navigation system employing a navigation solution processor with a neural network system in accordance with the invention.

Turning now to the drawings, in which like reference numerals are used to designate like or corresponding elements among the several figures, in FIG. 1 there is shown a GPS navigation system 10 that incorporates aspects of the present invention. The GPS navigation system 10 includes a satellite receiver/processor 12 that receives GPS signals and processes them to generate GPS satellite-related navigation data 14 such as satellite position and pseudorange data. The GPS satellite-related navigation data 14 is provided to a navigation solution processor 16, which, in accordance with the present invention, employs a neural network. The navigation solution processor 16 processes the satellite-related navigation data 14 to generate receiver-related navigation data 18 such as receiver position. The receiver-related navigation data 18 is provided to a map-matching processor 20 which processes the data together with map data 22 stored in a map data base 24 to generate positional display data 26 which is fed to a display 28. A detailed description of the processing of the map-matching processor 20 and map data base 24 is included in U.S. Pat. No. 6,041,280, the disclosure of which is hereby incorporated by reference.

While FIG. 1 depicts a navigation system 10 in which the receiver-related navigation data 18 is provided to a map-matching processor 20, the invention is not limited to such navigation systems. The receiver-related navigation data 18 produced by the navigation solution processor 16 may be provided to complimentary devices including, but not limited to, presentation devices comprising display units, processing devices such as computer systems, and/or transmission/communication devices such as cellular telephones and pagers. These complimentary devices may function to generate navigation routes, find nearest geographic landmarks, and/or transmit data across a communication link.

Figure 2:
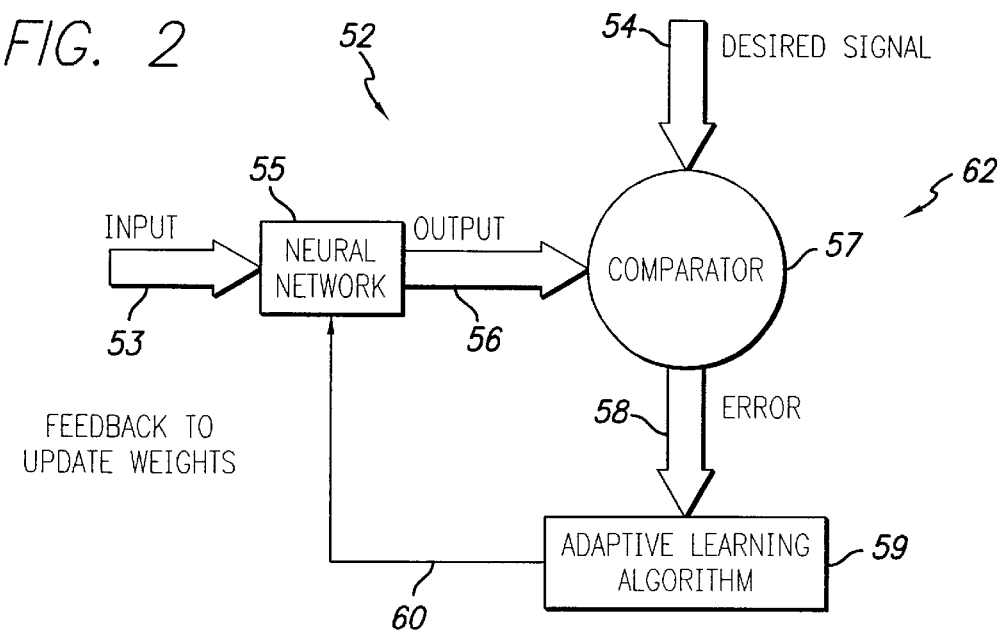
FIG. 2 is a block diagram of the neural network system of FIG. 1 depicting a neural network and a training processor.

Referring to FIG. 2, the navigation solution processor 16 includes a neural network system 52 which includes a neural network 55 and a training processor 62. The training processor 62 includes a comparator 57 and an adaptive learning processor 59. The neural network system 52 is configured such that the neural network 55 receives the satellite-related navigation data 14 as an input signal 53 and provides the receiver-related navigation data as an output signal 56. The output signal 56 is input to the comparator 57 where it is compared with a desired signal 54 to produce an error signal 58 that results from the difference between the output signal and the desired signal. The error signal 58 is introduced into the adaptive learning processor 59 that produces an update signal 60. As described below, this update signal 60 is used to affect a weighting function in the neural network 55.

Figure 3:
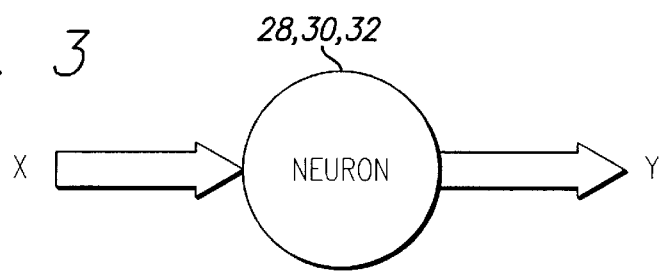
FIG. 3 is a block diagram depicting a typical neuron for the neural network of FIG. 2.
Figure 4:
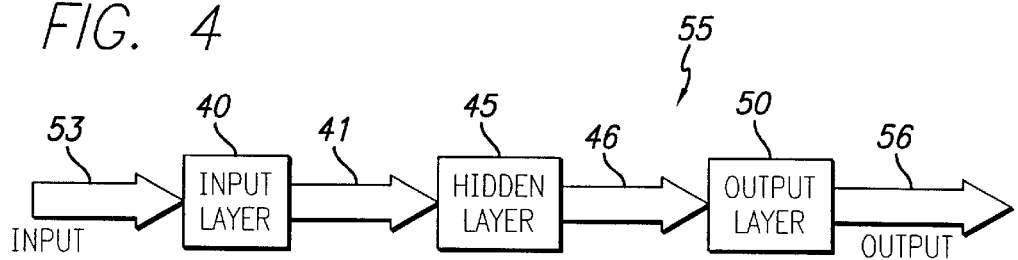
FIG. 4 is a block diagram depicting a three layer topography of the neural network of FIG. 2.
Figure 5:
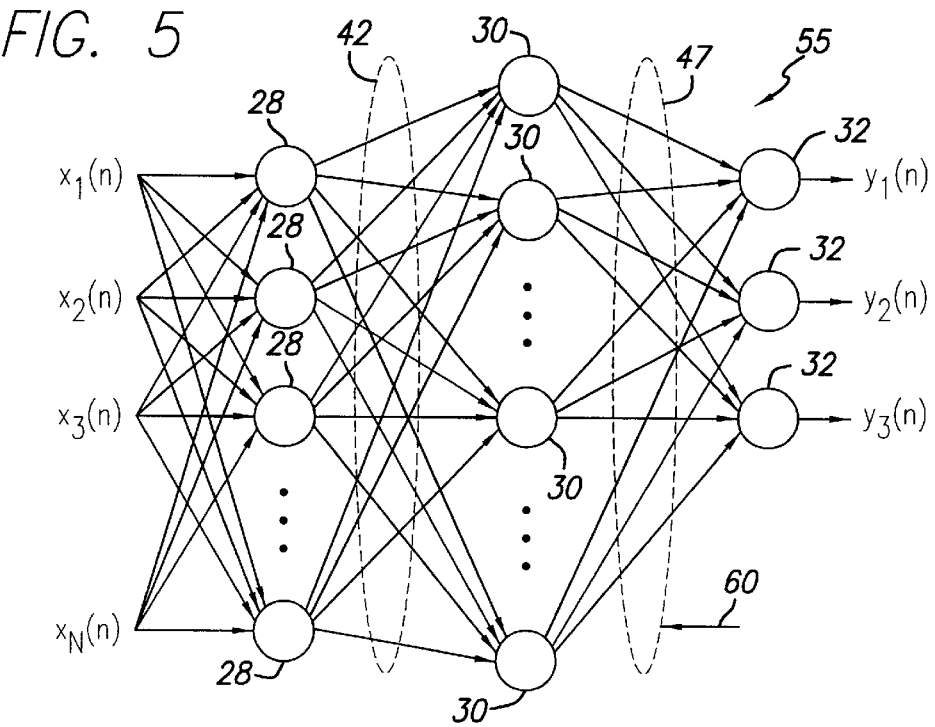
FIG. 5 is a schematic diagram depicting a plurality of neurons within the input, hidden, and output layers of the neural network of FIG. 4.

Referring now to FIGS. 3–5, the neural network 55 comprises a collection of neurons 28, 30, 32 that perform specific functions. In its simplest form, a single neuron 28, 30, 32 (FIG. 1) is a processing unit, taking an input X and producing an output Y. Each neuron 28, 30, and 32 (FIG. 5)

of the RBF neural network 55 may be represented by the following input-output relationship:

$$Y = \exp(-|X-C|/\sigma^2) \qquad (Eq. 1)$$

where
X=input
Y=output
C=termed as the center of a Gaussian function;
σ=width of the Gaussian function; and
| |=Vector magnitude.

The choice of C and σ play a critical role in the training and stability of the neural network system 52. There are no theoretical guidelines for choosing these numbers so they are chosen on heuristic grounds by experimental or trial and error techniques. The performance of the neural network system 52 is not very sensitive to this choice in the convergence region.

The neural network 55 (FIG. 5) consists of a plurality of neurons 28, 30, 32 which together are intended to operate to mimic the human brain and the thought processes of the human brain. There are numerous types of neural network models which may be employed in the present invention. Basic neural network model include discrete-time Hopfield neural networks, continuous-time Hopfield neural networks, cellular neural networks, multilayer perception networks, self-organizing systems, radial basis function (RFB) networks, and high-order neural networks. A RBF is a multidimensional function that depends on the distance between the input vector and a center vector. An RBF is a powerful tool for multidimensional approximation or fitting that essentially does not suffer from the problem of proliferation of the adjustable parameters as the dimensionality of the problem increases. For illustration purposes, a radial basis function neural network is described herein. However, a person of ordinary skill in the art will appreciate that any one of the various types of neural network models may be adapted and utilized within the present invention.

Referring to FIGS. 4 and 5, the RBF neural network 55 consists of a first, or input, node layer 40, a second, or hidden, node layer 45 and a third, or output, node layer 50. Each node layer 40, 45, 50 is defined by a plurality of neurons. For example, the input layer 40 is defined by a plurality of input neurons 28 (FIG. 5), the hidden layer 45 is defined by a plurality of hidden neurons 30, and the output layer 50 is defined by a plurality of output neurons 32.

The number of input neurons 28 in the input node layer 40 is determined based on the number of satellites being tracked. Four input neurons 28 are used for each satellite. For example, if six satellites are being tracked then twenty-four input neurons 28 are used. Each satellite provides four pieces of input data, including pseudorange data, x position coordinate data, y position coordinate data and z position coordinate data. Each of the input neurons 28 of the input layer 40 receives each piece of data from each of the satellites. With reference to FIG. 5, each piece of data is identified as $x_i(n)$ where i varies from 1 to N, N is four times the number of satellites being tracked and n is the type of data, i. e., pseudorange, x, y and z position coordinate data.

Each input neuron 28 generates a single output 41 which is fed to each of the hidden neurons 30. The input neurons 28 have linear functions which simply feed each piece of data $x_i(n)$ to the hidden neurons 30. The connection between the input layer 40 and the hidden layer 45 is not weighted, that is, each hidden neuron 30 within the hidden layer 45 receives each corresponding piece of data $x_i(n)$ from the input neurons 28 of the input layer 40 unaltered.

The output 41 of each of the input neurons 28 is connected to each of the hidden neurons 30 of the hidden layer 45 through a first connection layer 42. Each hidden neuron 30 receives the input 41 from each input neuron 28 and generates a single output 46. Each hidden neuron 30 of the hidden layer 45 processes the collection of data $x_i(n)$ under the radial basis function as dictated by the transfer function of Eq. 1 to produce the output 46.

The single output 46 of each hidden neuron 30 is input through a second connection layer 47 to each output neuron 32 of the output layer 50. The output 46 of each hidden neuron 30 is fed to each and every output neuron 32 of the output layer 50. The second connection layer 47 between the hidden layer 45 and the output layer 50 is weighted. Each output neuron 32 of the output layer 50 has an input-output relationship as defined by equation one (Eq. 1) so that they perform computations that result in an output signal 56 representing an estimated output position. The output signal 56 comprises individual outputs $y_i(n)$, where i is equal to the number of positional data and n is the type of positional data, i. e., x, y and z position coordinate data.

The functionality of a neural network 55 depends on its ability to produce converging results within a given training algorithm. Therefore, in the design of the neural network 55 of the present invention, there must be determined and included a sufficient number of hidden neurons 30 within the hidden layer 45. The characteristic of a neural network 55 is such that a minimum number of hidden neurons 30 must be present in order to produce a viable estimated result. The number of necessary hidden neurons 30 are determined by heuristic means such as experimental or trial and error techniques. Simulations are used to determine the number of hidden neurons 30 needed within the hidden layer 45. For example, a GPS navigation system utilizing six GPS satellite measurements require 128 hidden neurons 30 to allow a training algorithm to converge. If less number of hidden neurons 30 are used, the training algorithm chosen fails to converge.

Neural networks must be "taught" to approximate desired estimated values. This "teaching" is accomplished by the use of adaptive unsupervised training algorithms. Numerous training algorithms are known in the art, for example, the Stochastic Gradient Descent algorithm, the Generalized Hebbian Algorithm, the LEAP algorithm, the Invariant-Norm Principal Component Analysis algorithm, and the Back Propagation algorithm. The training algorithm employed in one configuration of the present invention is a variation of Conjugate Gradient Algorithm. As shown in FIG. 2, the training processor 59 receives as input 58 the difference between the output signal 56 of the neural network 55 and the desired signal 54. The output signal 56 of the neural network 55 is compared with a desired signal 54 and the difference between the two signals results in an error value 58. The error value 58 (ε(k)) is processed by the adaptive learning algorithm of the training processor 59.

The training processor 59 produces a weight update value 60 for feed back into the neural network 55. The weight update value 60 is used to update the weights in the second connection layer 47 of the neural network 55. This process is iterative and therefore is repeated until the signal output 56 of the neural network 55 converges with the desired signal 54.

The training processor 59 utilizing an adaptive learning algorithm, such as the Conjugate Gradient Algorithm, produces updates 60 to the weights of the neural network 55.

The weights of the neural network 55 are updated according to the following update equations:

$$H(k)=H(k-1)+G(k)\beta(k) \quad \text{(Eq. 2)}$$

where G(k) is computed as a function of the time index k as follows:

$$G(k) = \frac{\Phi(k)}{|\Phi(k)|^2}\left(1 - \lambda\frac{|\epsilon(k-1)|}{|\beta(k)|}\right) \quad \text{(Eq. 3)}$$

where:

H(k)=weight vector at time index k.

Φ(k)=transfer function of the RBF neuron at time index k.

λ=convergence parameter 0<λ<1

ϵ(k)=error value, d(k)−y(k)

d(k)=desired signal at time index k.

y(k)=output of the neural network at time index k.

β(k)=d(k)−H$^T$(k−1)Φ(k)

The weight vector H(k) is constructed using all the weights in the neural network 55.

GPS navigation systems are especially adaptable to neural network solutions. GPS navigation equations are continuous and differentiable and hence the inverse model of GPS equations is also continuous and differentiable. Moreover the equations are fixed for a given number of GPS satellite measurements which guarantees the existence of the inverse function.

In the application of the system depicted in FIG. 2 to GPS navigational systems, the GPS navigation equations in their simplest form can be represented as:

$$Pr=|SV-P|+B \quad \text{(Eq. 4)}$$

where

Pr=pseudorange measurement (the distance between the satellite and the user).

SV=GPS satellite position vector in earth-centered earth-fixed (ECEF) coordinate system P=user position vector in ECEF B=user clock bias In Eq. 4, Pr and SV are known and P and B values are unknown. The number of such equations is dictated by and equal to the number of GPS satellite measurements. These equations can be solved for P and B when four or more such equations can be constructed using measurements from four or more GPS satellites.

In accordance with the present invention, the relationship between the user position and GPS satellite positions and pseudorange measurements is treated as a function and written as $$P=f(SV_i, Pr_i) \quad \text{(Eq. 5)}$$

where $SV_i$=Position vector of the i$^{th}$ GPS satellite in ECEF $Pr_i$=Pseudorange measurement for the i$^{th}$ GPS satellite The function f does not have a specific closed form representation, however, so long as the number of satellites remain fixed this functional relationship remains fixed. This function can be approximated using the neural network 55 as described above to any degree of accuracy if there are sufficient hidden neurons 30 within the hidden layer 45 of the neural network 55.

Figure 6:
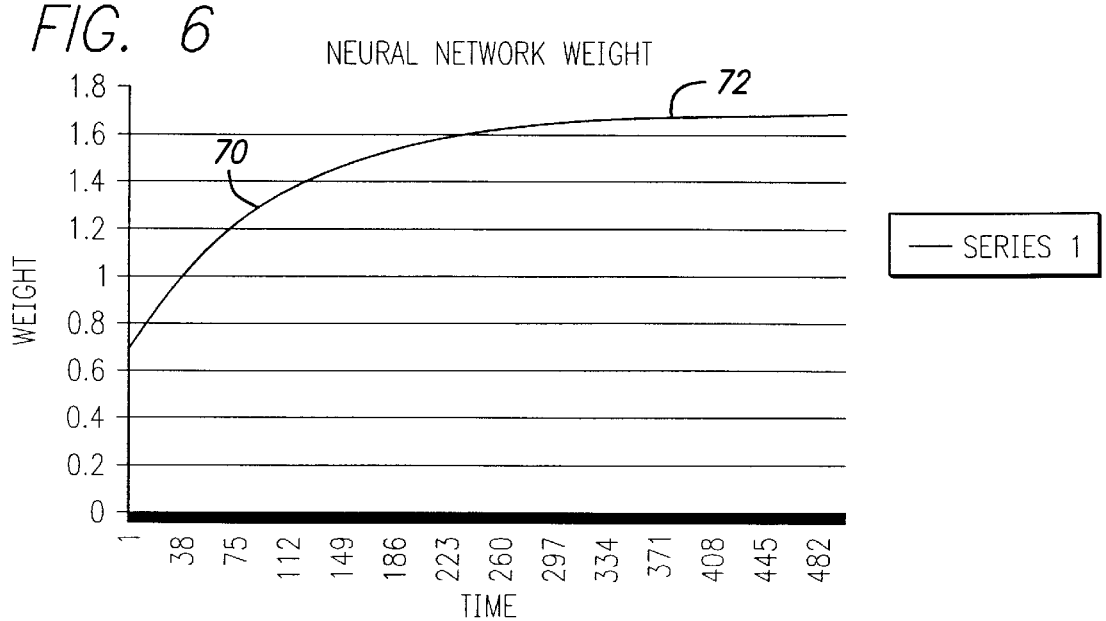
FIG. 6 is a plot depicting convergence of the weight during the training process when the number of neurons within the neural network is 256.
Figure 7:
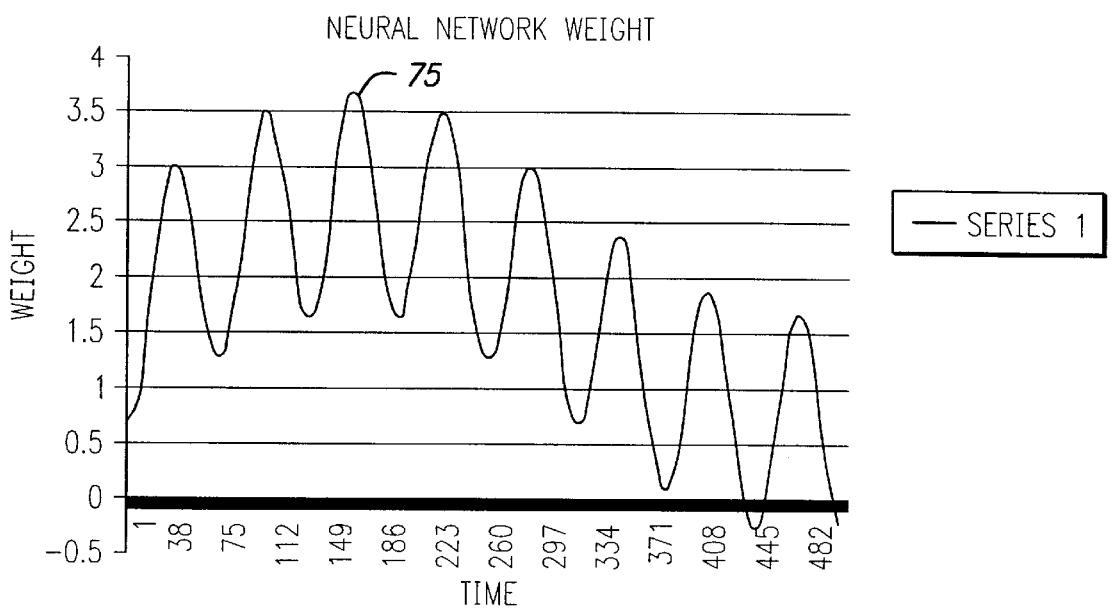
FIG. 7 is a plot depicting non-convergence of the weight during the training process when the number of neurons within in the neural network is 75.

Referring to FIGS. 6 and 7, simulations of GPS navigation system operating in accordance with the present invention offer satisfactory results. Neural networks 55 can be trained for a specific number of satellite measurements and the number of hidden neurons 30 and the associated weights can be pre stored without sacrificing output position accuracy. Utilizing a simulation model for training the neural network 55, a random GPS constellation with six GPS satellites is chosen with a position dilution of precision (PDOP) of approximately three. Over the period of the training the PDOP changes to approximately three point two (3.2). No noise is simulated in the training sequence as to ensure that the learning is accurate. The weights of the neural network 55 are initialized to small random values generated using uniform random numbers between negative one and one (−1 and 1). A sample 70 of the weight while learning when the number of hidden neurons 30 in the hidden layer 45 is 256 is plotted as a function of time (as shown in FIG. 6). As can be observed from the plot, the weight plot levels off 72 at or about five minutes, thereby illustrating that the learning algorithm converges at or about five minutes (297 seconds).

However, as shown in FIG. 7, a sample 75 of weight while learning, when the number of nodes in the hidden layer is seventy-five is plotted as a function of time, it is seen that the learning algorithm does not converge but oscillates wildly. The oscillation is highly systematic implying system instability. This may mean that the approximation of the functional mapping from pseudoranges and GPS satellite positions to user position is not possible with only seventy-five hidden neurons 30 within the hidden layer 45.

Figure 8:
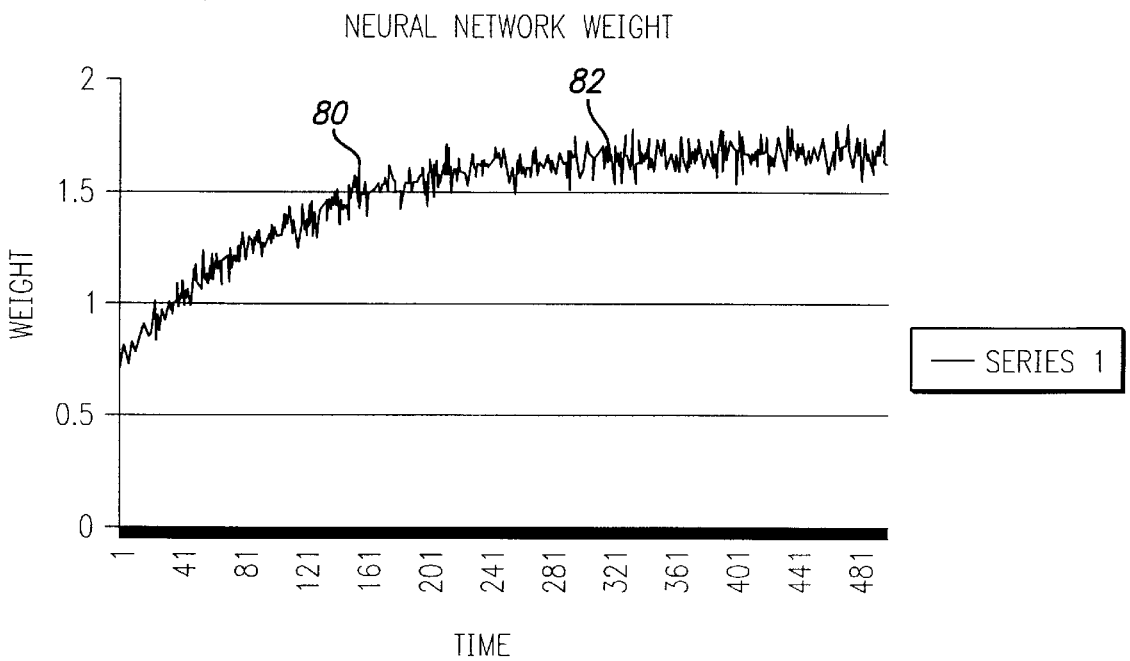
FIG. 8 is a plot depicting convergence of the weight during the training process when the number of neurons within the neural network is 256 and when Gaussian noise with one meter (m) standard deviation is present on all six satellite measurements and where clock bias is initialized at ten meter (m) and where clock drift is set equal to one meter per second (m/s)
Figure 9:
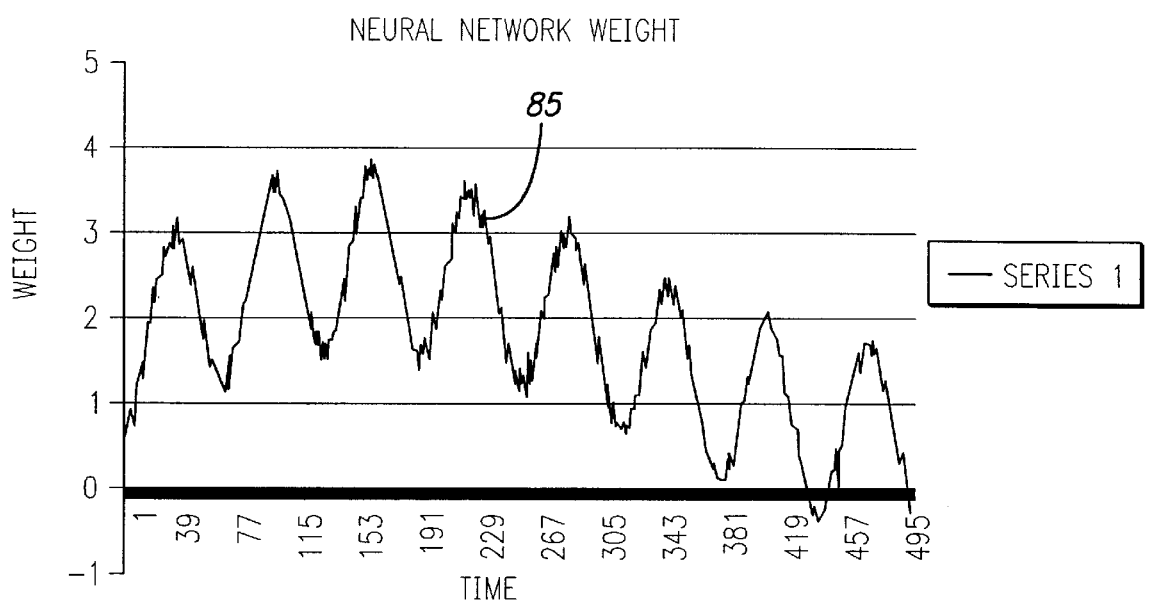
FIG. 9 is a plot depicting non-convergence of the weight during the training process when the number of neurons within the neural network is 75 and when Gaussian noise with one meter (m) standard deviation is present on all six satellite measurements and where clock bias is initialized at ten meter (m) and where clock drift is set equal to one meter per second (m/s)

Referring to FIGS. 8 and 9, the samples 80 and 85 of weights are plotted when there is added a Gaussian noise with one meter (m) standard deviation on all six satellite measurements and where the clock bias is initialized at ten meter (m) and clock drift is set equal to one meter per second (n/s). As shown in FIG. 8, having 256 hidden neurons 30 within the hidden layer 45, the plot of the weight versus time show similar convergence characteristics as that of FIGS. 6. Again, the weight plot levels off 82 at or about five minutes (300 seconds). This is illustrative of the fact that the learning algorithm converges at or about the same time. Alternatively, as shown in FIG. 9, where only seventy-five hidden neurons 30 are utilized within the hidden layer 45, the sample weight versus time plot does not level off thereby showing no convergence of the learning algorithm.

Figure 10:
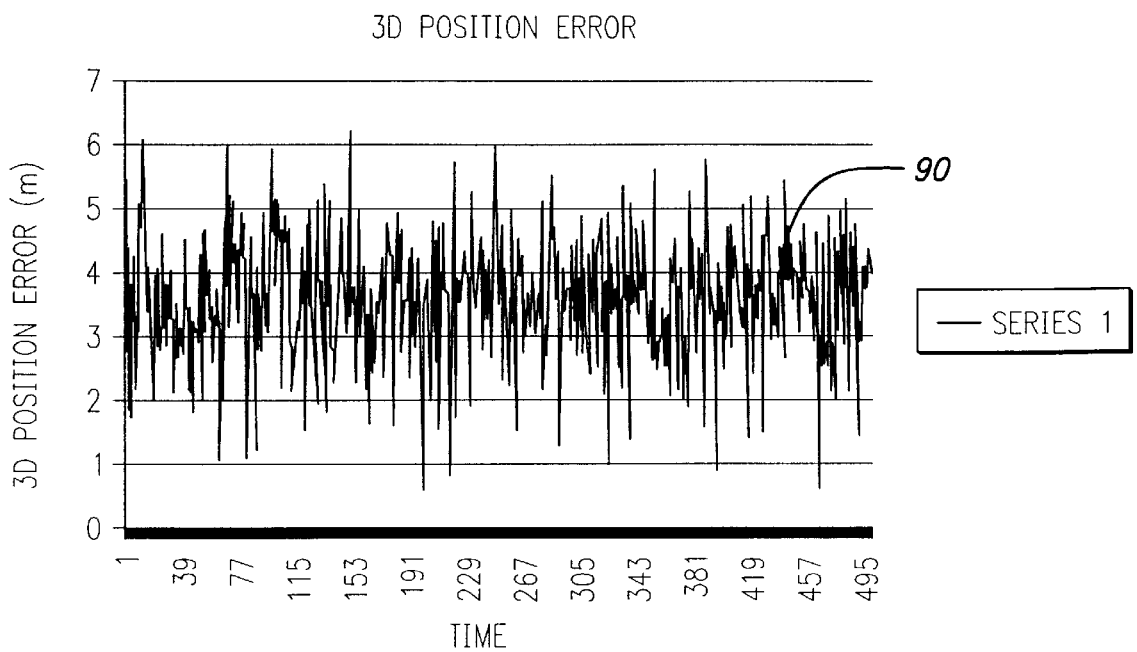
FIG. 10 is a plot depicting an average 3D position error of 3.5 where Gaussian noise with one meter (m) standard deviation is added to all measurements.

To evaluate the performance of the trained neural network system 52 a different constellation of GPS satellites is chosen with six GPS satellites having a PDOP of four at the beginning and 3.8 at the end. Without noise the system computes an accurate output position. FIG. 10 shows the three dimensional position error when Gaussian noise with 1 m standard deviation is added to all the measurements. The average three dimensional position error is 3.5 meters. This is less than expected from the DOP of four to 3.8 meters. This result is indicative of the efficiency of the trained neural network system 52 when used in GPS navigation systems.

To evaluate the effects of bad geometry, a six satellite constellation with PDOP of twelve to 12.5 is simulated. The neural network navigation system shows continued stable behavior and the average three dimensional position error is ten meters which is again somewhat smaller that what the DOP value would predict.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A navigation system for tracking the position of an object within a geographic area, said system comprising:

a satellite receiver/processor having an input receiving input signals from at least one GPS satellite and an output providing satellite-related navigation information and a neural network having an input receiving the satellite-related information to obtain an output signal representative of receiver-related navigation information; and at least one complimentary device for making use of the receiver-related navigation information;

wherein the neural network comprises one of either a discrete-time Hopfield neural network, a continuous-time Hopfield neural network, a cellular neural network, a multilayer perception networks, a self-organizing system, a radial basis function network or a high-order neural network.

2. The system of claim 1 wherein the complimentary device comprises a presentation device.

3. The system of claim 2 wherein the presentation device comprises:

a map data base storing information related to the geographic area;

a map matching processor receiving as input the receiver-related navigation information and combining the geographic-area information therewith to provide display information; and a display responsive to the display information for providing an indication of the position of the object.

4. The system of claim 1 wherein the complimentary device comprises a processing device.

5. The system of claim 1 wherein the complimentary device comprises a transmission/communication device.

6. A navigation system for tracking the position of an object within a geographic area, said system comprising:

a satellite receiver/processor having an input receiving input signals from at least one GPS satellite and an output providing satellite-related navigation information and a neural network having an input receiving the satellite-related information to obtain an output signal representative of receiver-related navigation information; and at least one complimentary device for making use of the receiver-related navigation information;

wherein the neural network comprises an first node layer connected to a second node layer through a first connection layer and a third node layer connected to the second node layer through a second connection layer.

7. The receiver of claim 6 wherein:

the first node layer comprises a plurality of input neurons receiving the input signals;

the second node layer comprises a plurality of hidden neurons connected to the plurality of input neurons through the first connection layer; and the third node layer comprises a plurality of output neurons connected to the hidden neurons through the second connection layer.

8. The system of claim 7 wherein the second connection layer is weighted.

9. The receiver of claim 7 wherein the output neurons comprise combining devices for combining the outputs of the hidden neurons to provide receiver position data.

* * * * *